United States Patent
Sauntry et al.

(10) Patent No.: US 6,327,702 B1
(45) Date of Patent: Dec. 4, 2001

(54) GENERATING A COMPILED LANGUAGE PROGRAM FOR AN INTERPRETIVE RUNTIME ENVIRONMENT

(75) Inventors: David M. Sauntry, Redmond, WA (US); Mark Gilbert, Waterloo (CA)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/223,440

(22) Filed: Dec. 30, 1998

(51) Int. Cl.⁷ ........................................................ G06F 9/45
(52) U.S. Cl. .................... 717/5; 717/4; 717/6; 717/7; 717/9
(58) Field of Search ................... 717/5, 9, 6, 4, 717/7; 703/6; 709/332; 712/245

(56) References Cited

U.S. PATENT DOCUMENTS

| | | | |
|---|---|---|---|
| 4,989,132 | * 1/1991 | Mellender et al. | 717/5 |
| 5,848,274 | * 12/1998 | Hamby et al. | 717/5 |
| 5,884,081 | * 3/1999 | Burbeck | 717/4 |
| 5,953,736 | * 9/1999 | O'Connor et al. | 711/6 |
| 5,970,249 | * 10/1999 | Holzle et al. | 717/5 |
| 5,995,754 | * 11/1999 | Holzle et al. | 717/9 |
| 6,009,517 | * 12/1999 | Bak et al. | 712/245 |
| 6,021,275 | * 2/2000 | Horwat | 717/7 |
| 6,026,485 | * 2/2000 | O'Connor et al. | 712/226 |
| 6,063,128 | * 5/2000 | Bentley et al. | 703/6 |
| 6,081,665 | * 6/2000 | Nilsen et al. | 717/5 |
| 6,098,089 | * 8/2000 | O'Connor et al. | 709/104 |
| 6,110,226 | * 8/2000 | Bothner | 717/5 |
| 6,122,638 | * 9/2000 | Huber et al. | 707/103 |
| 6,151,703 | * 11/2000 | Crelier | 717/6 |
| 6,161,217 | * 12/2000 | Detlefs et al. | 717/5 |
| 6,186,677 | * 2/2001 | Angel et al. | 717/5 |
| 6,260,078 | * 7/2001 | Fowlow | 709/332 |

OTHER PUBLICATIONS

Title: Optimizing ML with Run–Time Code Generation, Author: Lee et al, ACM, 1996.*

Title: A Specification of Java Loading and Byte Code Verification, ACM, 1998.*

Title: Type feedback vs. concrete type inference: a comparison of optimization techniques for object–oriented languages, Author: Agesen et al, ACM, 1995.*

* cited by examiner

Primary Examiner—Mark R. Powell
Assistant Examiner—Chameli C Das
(74) Attorney, Agent, or Firm—Workman, Nydegger & Seeley

(57) ABSTRACT

An inlining code generator, executing external to a runtime environment, reproduces the processing of an innerloop of an interpreter for the runtime environment. The inlining code generator processes a program in the interpreted language and produces a corresponding program in a compiled language. The compiled language program is compiled into a native language program using a standard compiler specific to the underlying hardware. Because the native language program operates within the framework of the runtime environment, functions and routines provided by the runtime environment are available to the native language program.

17 Claims, 6 Drawing Sheets

GENERATING A COMPILED LANGUAGE PROGRAM FOR AN INTERPRETIVE RUNTIME ENVIRONMENT

FIELD OF THE INVENTION

This invention relates generally to interpretive runtime environments and more particularly to generating code in a compiled language for execution in an interpretive runtime environment.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1997, Microsoft Corporation, All Rights Reserved.

BACKGROUND OF THE INVENTION

Interpreted languages are widely used to make computer programs portable across diverse hardware platforms. The same interpreted language program can be easily moved from one type of computer to another; only the runtime environment which performs the interpretation must be tailored specifically to the underlying hardware.

This benefit of an interpreted language is also its greatest drawback. A program written in an interpreted language executes significantly slower than the same program written in a compiled language on the same computer. Previous solutions to the problem all contain major flaws.

For example, native code compilers have been implemented which convert the instructions of the interpreted language into equivalent instructions in a language native to the specific hardware. The native code program is then executed. However, because the compiled native code program does not execute in the interpretive runtime environment, any functions provided by the runtime environment are unavailable to the program. Such a program is also frequently much larger than the interpreted language program, resulting in resource issues on minimally configured computers.

Another approach taken was to convert the interpreted language program, as a whole, into a program in a compiled language which accomplishes the same functions. Such efforts have proved highly complex to implement and result in inefficient compiled code.

Therefore, what is needed is a way to increase the performance of an interpreted language program while providing access to the functions of the corresponding runtime environment, and to do so in a fashion that converses system resources.

SUMMARY OF THE INVENTION

The above-mentioned shortcomings, disadvantages and problems are addressed by the present invention, which will be understood by reading and studying the following specification.

An inlining code generator, executing external to a runtime environment, reproduces the processing of an innerloop of an interpreter for the runtime environment. The inlining code generator processes a program in the interpreted language and produces a corresponding program in a compiled language. The compiled language program is compiled into a native language program using a standard compiler specific to the underlying hardware. The native language program executes within the runtime environment in the same fashion as if it had been interpreted by the interpreter.

The inlining code generator eliminates the overhead associated with running interpreted code programs by exporting the processing time for the innerloop to the code generator. Because the inlining code generator accepts existing interpreted language programs as input, the portability benefits afforded by those programs remain, while, at the same time, the execution of those programs be optimized when they are run on a particular computer. Furthermore, because the resulting native language program operates within the framework of the runtime environment, functions and routines provided by the runtime environment are available to the native language program.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular Java implementation of the invention is described. Finally, in the fifth section, a conclusion of the detailed description is provided.

Hardware and Operating Environment

Figure 1:
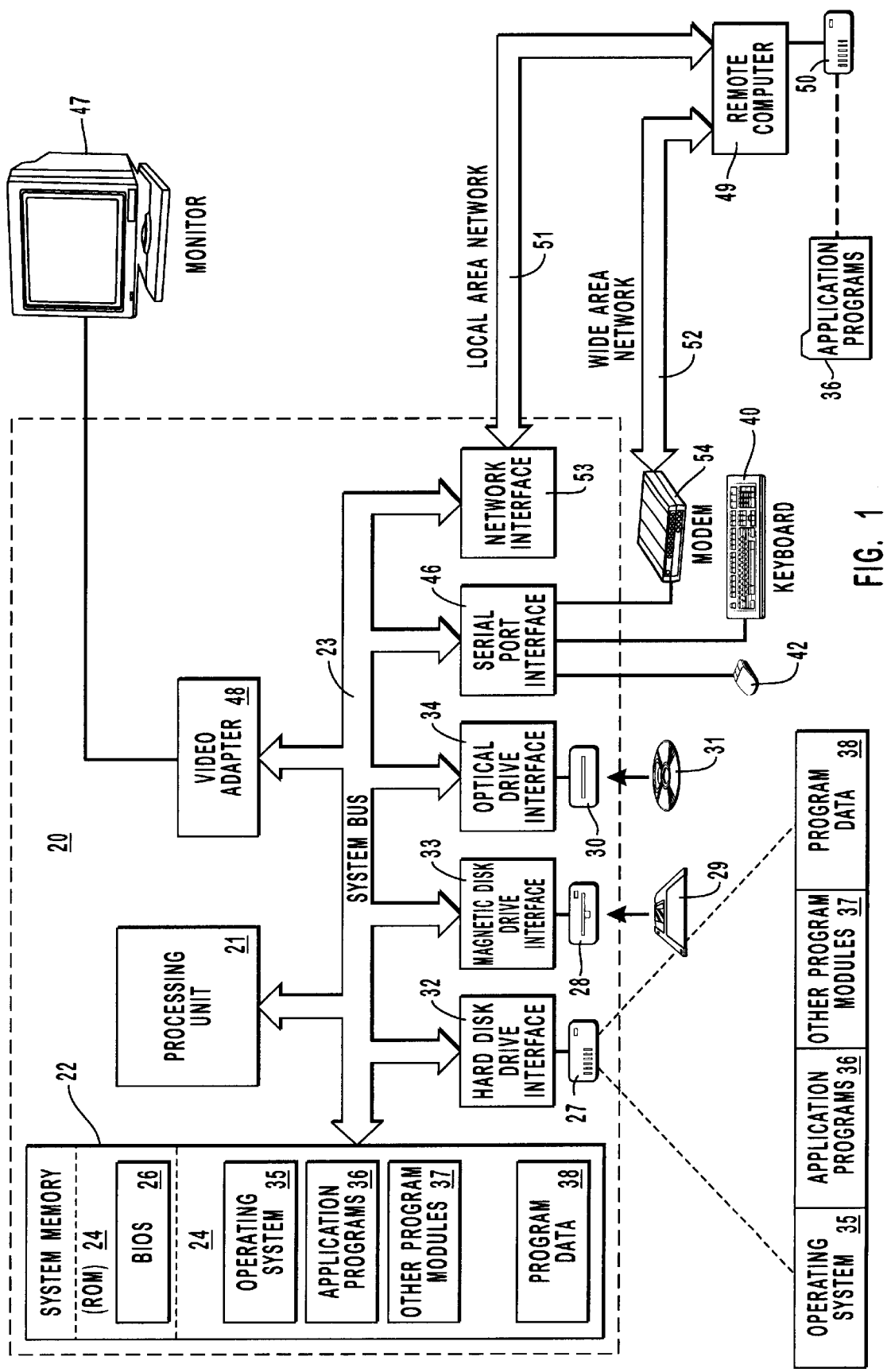
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

A system level overview of the operation of an exemplary embodiment of the invention is described by reference to FIGS. 2A–C.

Figure 2A:
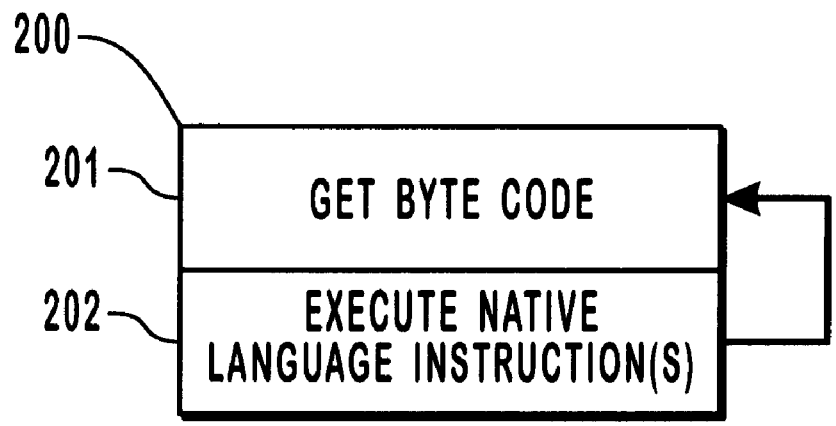
FIGS. 2A–C are diagrams illustrating a system-level overview of an exemplary embodiment of the invention.

FIG. 2A shows the logic blocks of a generic computer language interpreter 200 that executes in a runtime environment in a computer such as computer 20 in FIG. 1. The interpreter 200 causes instructions in the interpreted language, commonly called "byte codes," to be executed as instructions in a language native to the runtime environment. In general, byte code and interpreted language code are referred to as "runnable" code because they are executed by the computer without needing to be compiled. Similarly, native language code, such as machine language code, is also runnable code.

When a program written in the interpreted language is run in the runtime environment, the interpreter 200 reads each byte code in the program and branches to a routine specific to the type of byte code (logic block 201). The interpreter then executes a native language instruction, or set of instructions, which performs the operation specified by the byte code (logic block 202). The process repeats until all byte codes in the program have been run.

Figure 2B:
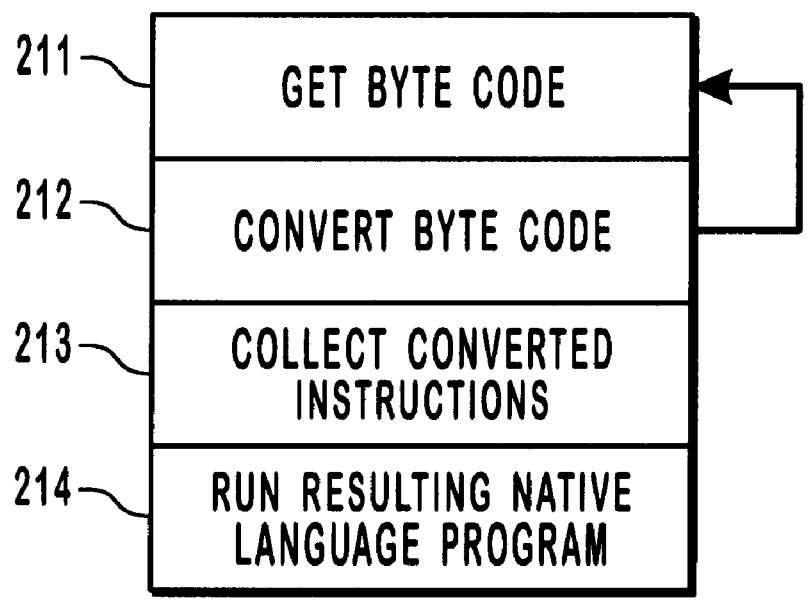

A different type of interpreter called a "just-in-time"(JIT) compiler 210 is illustrated in FIG. 2B. Instead of interpreting each byte code and performing its operation immediately, the JIT compiler 210 converts all the byte codes in the program into equivalent instructions in a native language (logic blocks 211 and 212). These instructions are then collected into a native language program (logic block 213) and executed (logic block 214). The logic blocks 211 and 212 collectively are referred to as the "innerloop" of the JIT compiler.

Figure 2C:
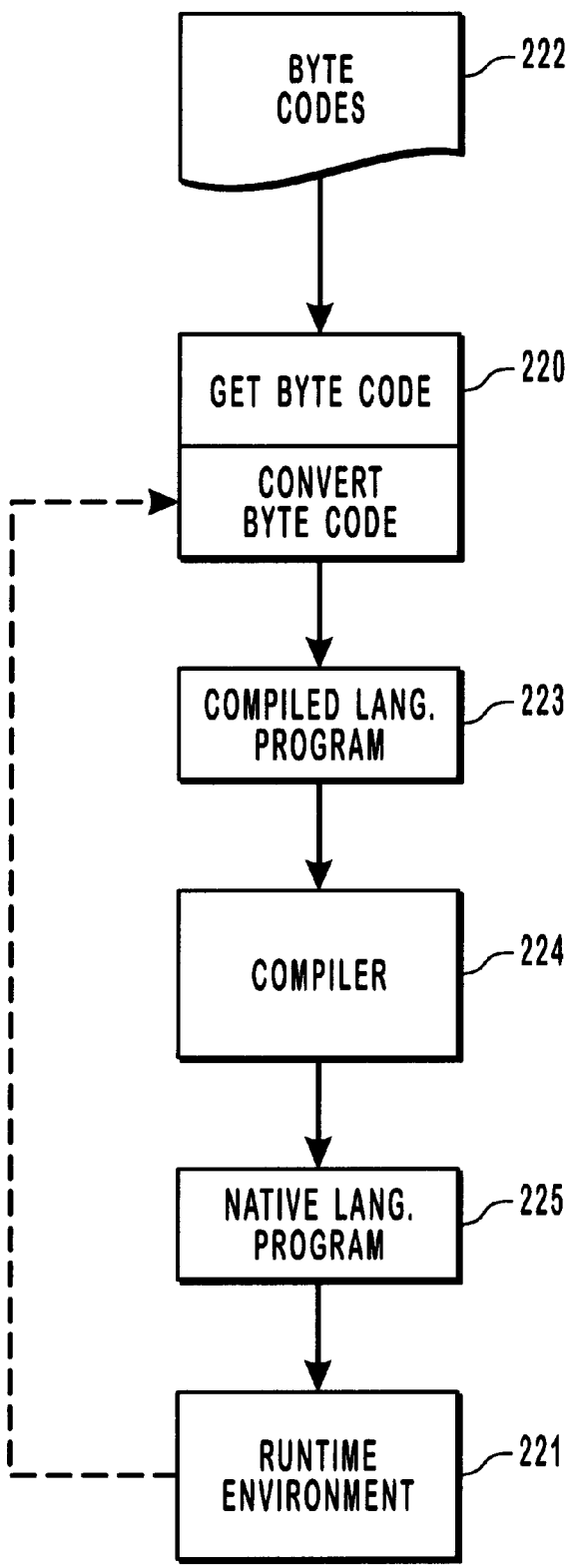

FIG. 2C illustrates one embodiment of an inlining code generator 220, executing external to a runtime environment 221, that reproduces the processing of the innerloop of the JIT compiler 210. A byte code program 222 is input into the inlining code generator 220 to produce a corresponding program in a compiled language 223. The compiled language program 223 is then compiled into a native language program 225 using compiler 224. When the native language program 225 is executed by the runtime environment 221, it appears to have been generated by a JIT compiler. Because the native language program 225 operates within the execution framework of the runtime environment 221, functions and routines provided by the runtime environment 221 are available to the native language program 225 as shown by the phantom connection between the inlining code generator 220 and the runtime environment 221. Moreover, because the compiler 224 is specific to the computer, it can optimize the generated code to remove redundant instructions and perform additional code optimizations for the hardware.

In one exemplary embodiment, the inlining code generator 220 outputs source code instructions for a high-level compiled language, such as C, and the compiler 224 is specific to that language.

In another exemplary embodiment, the inlining code generator 220 outputs instructions in a compiler intermediate language. A compiler intermediate language is used to communicate between language-specific compiler logic and hardware-specific compiler logic. The intermediate language instructions produced by the inlining code generator are passed to the appropriate hardware-specific compiler logic, i.e., compiler 224, to produce the native language program.

The system level overview of the operation of an exemplary embodiment of the invention has been described in this section of the detailed description. An inlining code generator implements the innerloop of a JIT compiler external to a runtime environment to eliminate the overhead associated with running interpreted code programs.

Because the inlining code generator accepts existing interpreted language programs as input, the portability benefits afforded by those programs remain, while, at the same time, the execution of those programs will be optimized when they are run on a particular computer. Furthermore, the inlining code generator generates code which utilizes any functions exported by the runtime environment. While the invention is not limited to any particular embodiment of an interpretive innerloop, for sake of clarity the high level functions of a JIT compiler innerloop have been described.

Methods of Exemplary Embodiments of the Invention

In the previous section, a system level overview of the operations of exemplary embodiments of the invention was described. In this section, the particular methods performed by a computer executing such exemplary embodiments are described by reference to a series of flowcharts. The methods to be performed constitute computer programs made up of computer-executable instructions. Describing the methods by reference to a flowchart enables one skilled in the art to develop such programs including such instructions to carry out the methods on suitable computer (the processor of the computers executing the instructions from computer-readable media).

Figure 3:
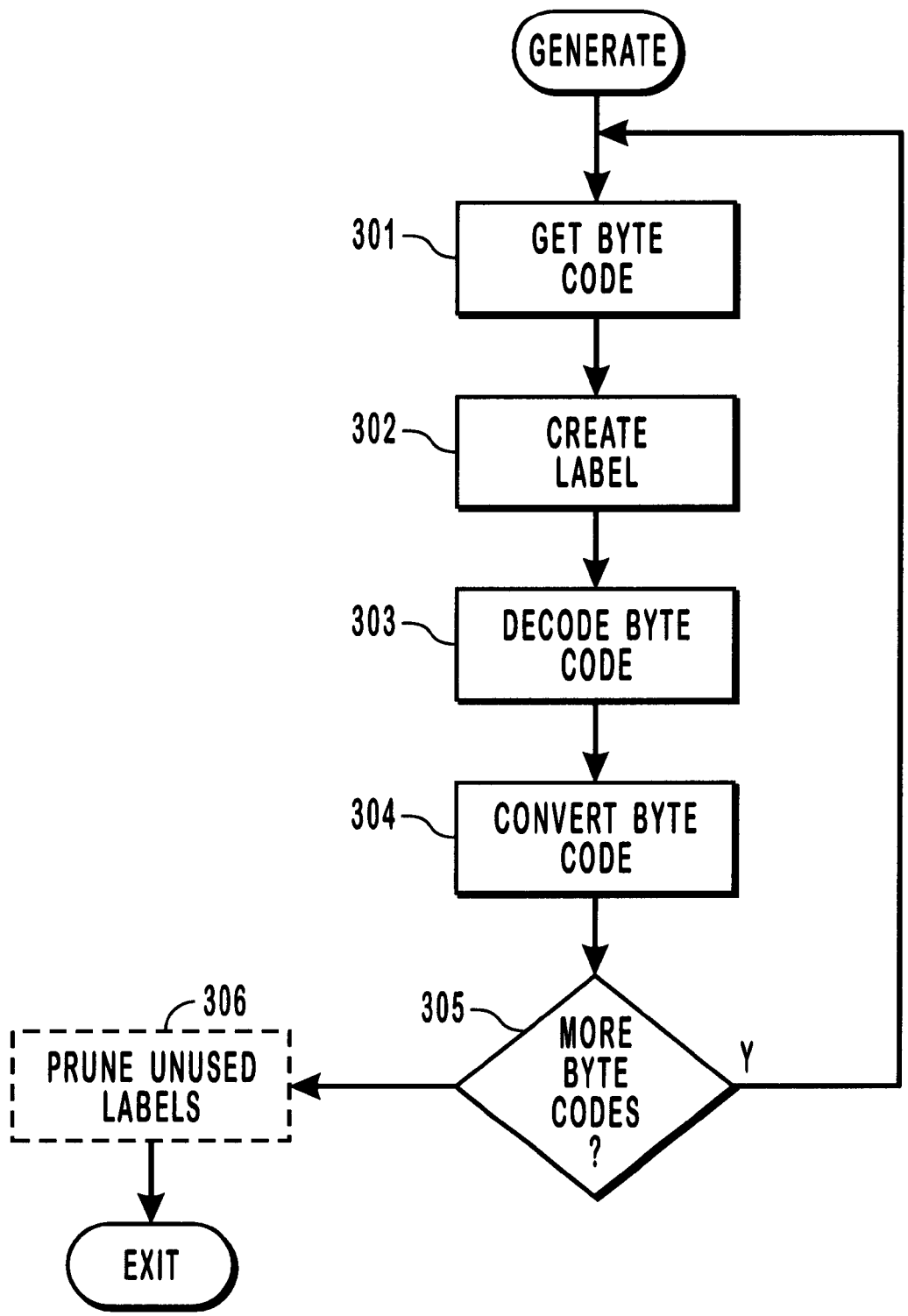
FIG. 3 is a flowchart of a method to be performed by a client according to an exemplary embodiment of the invention.

Referring first to FIG. 3, the acts to be performed by a computer executing the inlining code generator 220 are shown. Starting at block 301, the first byte code in the program is read in. A unique label for the byte code is generated (block 302) as explained in more detail below. The type of byte code is determined (block 303) and the byte code is converted into its equivalent compiled language instruction or set of instructions (block 304). The inlining code generator 300 continues processing each byte code in the program until all the byte codes have been converted (block 305). As will be immediately understood by one skilled in the art, the type of instructions produced at block 304 depend on whether the inlining code generator is outputting compiled language source code or compiler intermediate code.

In most byte code programs, when the logic needs to jump to a byte code that is out of sequence, a branch instruction specifying an offset for the target byte code relative to the branch instruction is used. Because the inlining code generator 300 creates a label for each byte code, the block 304 converts the offset value in the branch instruction into the label for the target byte code. In one embodiment, each label generated at block 302 comprises its offset relative to the beginning of the program. The inlining code generator subtracts the relative offset specified in the branch instruction from the offset in the branch instruction's label to calculate the label for the target byte code. Alternate ways of equating the original byte codes with the labels generated for the equivalent instructions, such as using an array to manage all the labels, will be readily apparent to one skilled in the art. In an alternate exemplary embodiment shown in phantom in FIG. 3, the code generator "prunes" the unused labels after all the byte codes are converted (block 306) so that only labels which are referenced by the final generated instructions are present.

As explained in the previous section, the code generated at block 304 has access to any global variables and/or functions that are exported by the runtime environment.

The particular methods performed by computer executing an exemplary embodiment of the invention have been described. The methods been shown by reference to a flowchart including all the steps from 301 until 306.

Java Virtual Machine Implementation

In this section of the detailed description, a particular implementation of the invention is described that is specific to the Microsoft Corporation implementation of the Java Virtual Machine (JVM).

Figure 4:
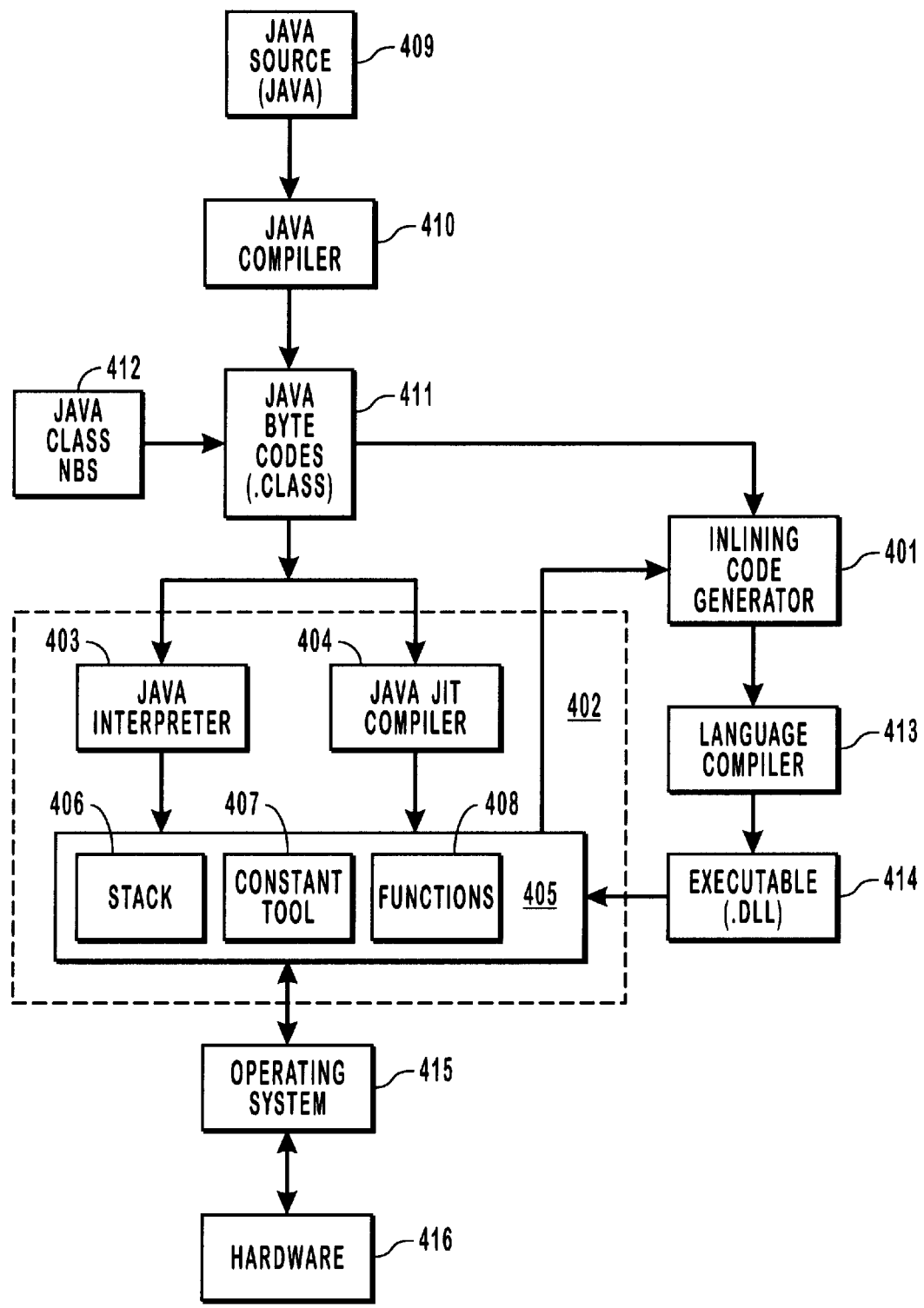
FIG. 4 is a system level diagram of an exemplary Java embodiment of the invention.

FIG. 4 illustrates an exemplary embodiment of the inlining code generator 401 of the present invention in conjunction with JVM 402. The JVM 402 is made up of three main components: a Java interpreter 403, a Java JIT compiler 404, and a runtime system 405. Because the JVM is a stack-based system, all objects created by programs executing in the runtime system 402 are stored in a stack 406. A constant pool 407 provides variables for the programs. Both the stack 406 and the constant pool 407 are managed by the runtime system 405. The runtime system 405 also provides specialized functions 408, such as background garbage collection of objects which are no longer in use.

A Java programmer creates objects and methods that act on the objects in Java source code ("java" file) 409, passes the java file 409 to a Java compiler 410 which produces the Java byte codes ("class" file) 411. When the inlining code generator 401 is used, the class file 411, and any Java class libraries 412 which contain methods referenced by the class file 411, are passed to the code generator 401. Compiled language code is generated by the code generator 402 and passed to a hardware-specific compiler 413 which produces an executable file (DLL) 414.

When an external method is invoked by a program executing in the runtime system 405, the JVM 402 determines if the method is in a byte code class file or in an executable DLL file as explained in more detail below. If the method is in a class file, the JVM 402 routes the class file 411 along with the necessary class libraries 412 to either the Java interpreter 403 or the Java JIT compiler 404 for conversion to executable code. The executable code is then routed to the runtime system 405 for execution. On the other hand, if the method is in a DLL file produced from the inlining code generator 401, the JVM 402 simply routes the DLL file 414 to the runtime system 405 for execution.

The JVM 402 also exports certain runtime system variables and methods to the code generator 401 so that the executable code in the DLL file 414 is able to obtain and manipulate the state of the JVM 402.

Table 1 below illustrates the C language instructions which are generated by the innerloop of the JIT compiler 404 for a subset of the Java byte codes. The C language instructions contain pointers to the stack 406, the constant pool 407, methods 408, and local variables in the runtime system 405 which have been exported by the JVM 402. The innerloop is coded as follows:

```
while (pCode++)
switch (*pCode)
...
case LDC
[corresponding C instructions as shown in Table 1]
...
case BEQ
[corresponding C instructions as shown in Table 1]
...
case IADD
[corresponding C instructions as shown in Table 1]
...
break
```

TABLE 1

| Java Byte Code | C Instruction(s) | Comment |
|---|---|---|
| LDC <index> | *pStack++ = m_pMethod->m_pClass->m_pConstantPool[index]; | move from constant pool to stack; increment stack |
| LLOAD | *pStack++ = pLocals[1]; | |
| INVOKESTATIC <index> | CMethod * pMethod = m_pMethod->m_pClass-> FindMethod(index);<br>If (ExecuteStaticMethod(pMethod, pStack) == FALSE)<br>{<br>  //exception occurred<br>  if (LookupException( ) == TRUE)<br>    goto label__<exceptionhandler - offset><br>  else<br>    return FALSE;<br>} | |
| BEQ <offset> | If (*pStack) goto label__<current - offset> | branch on equality to byte code offset |
| IADD | *(pStack - 1) += *(pStack);<br>pStack--; | add 2 stack values together & place result on stack; decrement stack |

Using the following Java byte code program as an example,

```
LDC<index1>
LDC<index2>
IADD
BEQ-3
``` the code generator 401 generates the following C language program:

```
label__1:
*pStack++=m__pMethod→m__pClass→m__pConstantPool[1];
label__2:
*pStack++=m__pMethod→m__pClass→m__pConstantPool[2];
label__3:
*(pStack-1)+=*(pStack);
pStack--;
label__4:
if (*pStack) goto label__1;
```

Because the executable code 414 is created outside the JVM 402, the JVM 402 does not have to loop through the innerloop of the JIT compiler 404 at runtime, thus significantly increasing performance over an identical byte code program which passes through the JIT compiler 404. Furthermore, constant pool 407 references are specifically coded by the code generator 401 so that the compiler 413 produces more efficient code for that portion of the C language program than the JIT compiler 404 which outputs code that is generic in nature. In an alternate exemplary embodiment in which the compiler 413 is an optimizing C compiler, the number of byte code equivalent instructions is reduced to a minimal set of compiled instructions.

Certain Java byte codes need to call back into the JVM 402 and so cannot be represented by C language instructions alone. The resulting generated code is illustrated in Table 1 by the INVOKESTATIC <Index> byte code which performs a call to another Java method. The generated code must first call FindMethod to get a pointer to the method (pMethod) which has been exposed by the JVM 402. Then the generated code must call the exported method, ExecuteStaticMethod, to execute the invoked method, and LookUpException to handle any exceptions which result from the execution. In an alternate exemplary embodiment, the instructions for both ExecuteStaticMethod and LookUpException are generated inline in the C language code for INVOKESTATIC.

Figure 5:
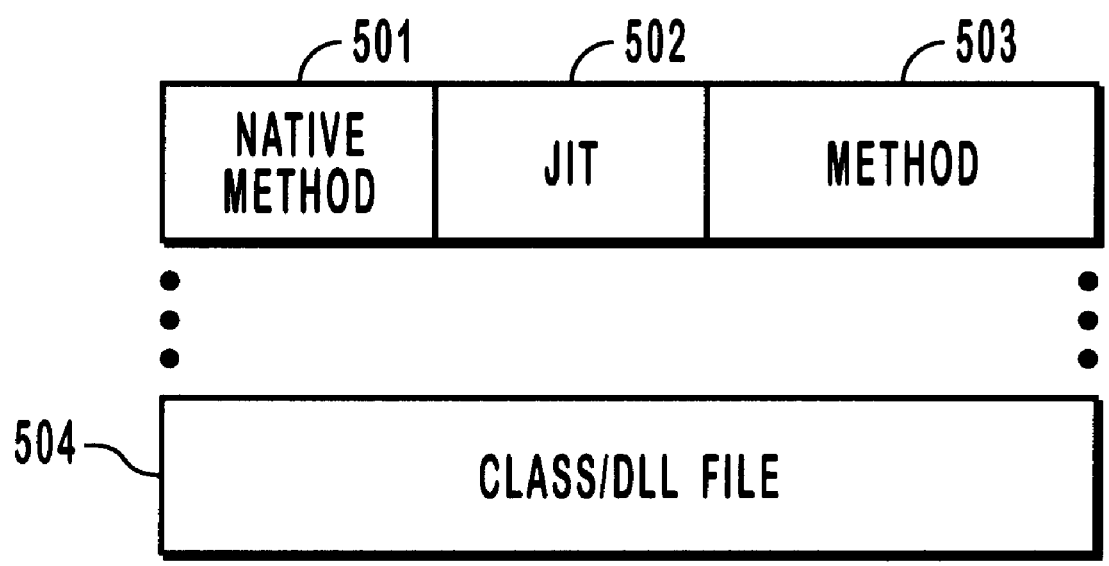
FIG. 5 is a diagram of a method state data structure for use in an exemplary implementation of the invention.

In the exemplary embodiment of the JVM 402, two flags, a native methods flag 501 and a JIT flag 502, for each method indicate the "state" of the method. The flags 501, 502 can be stored in an internal, in-memory representation of the class or can be persisted in a data file. An exemplary data structure containing the flags is illustrated in FIG. 5. The JVM 402 uses the flags 501, 502 to determine how to load a method invoked within the runtime system 405.

When neither flag is set, the JVM 402 loads the byte codes for the method and calls either the interpreter 403 or the JIT compiler 404 to process the codes. This case represents a Java to Java call.

If only the native method flag is set, the JVM 402 loads the corresponding DLL, searches through the DLL for the entry point for the invoked method, and calls the method through a native method interface, such as JNI or RNI. This case is handled as a call to "imported" code.

If only the JIT flag is set, the JVM 404 recognizes that the method is already compiled into machine code, jumps directly to the method's entry point in the corresponding DLL file, and executes the appropriate code. Executable code generated and compiled using the present invention is handled in this fashion.

Other location that can be used to maintain the state of each method will be readily apparent to one skilled in the art. For example, in one alternate exemplary embodiment, the state of each method is stored within the corresponding class file itself. In another alternate exemplary embodiment, the J/Direct extension, which maintains a private set of data to point to the entry point of a method, is employed.

This section has described an inline code generator that converts Java byte codes into equivalent instructions in a compiled language. The compiled language instructions are then passed to a compiler which produces executable, machine language code. The executable code can then be called directly from the current Java runtime system, and since it obeys all of the stack operations of the interpreted byte code, the existing garbage collector and other runtime features operate as normal. The executable code only needs to update the JVM's information of what equivalent byte code it is executing when a function call is being made or an exception being thrown. Because of this, and the fact that basic stack operations can be optimized by the compiler to use registers, the inlining code generator speeds the execution of Java byte code significantly over an interpreter or JIT compiler.

Conclusion

An inlining code generator has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that all while all Java Virtual Machines are stack-based, not all JVMs have a constant pool as described in the previous section. Because the term "constant pool" can be applied to any collection of available variables that hold constants, equivalent structures to the constant pool include variable stores which are implemented within a class files and decoded into a hash table at load time.

Furthermore, those of ordinary skill within the art will readily appreciate that different runtime environment will export different methods, i.e., exception handling, invocation of methods, and/or memory allocation, which can be utilized by the generated code. Therefore, the generated code will be specific to the runtime environment, as is true of code created by a interpreter or a JIT compiler, and limited only by the inherent limitations of the runtime environment in which the inlining code generator is implemented.

The terminology used in this application with respect to is meant to include all runtime environments, both past, current and future. Therefore, it is manifestly intended that this invention be limited only by the following claims and equivalents thereof.

We claim:

1. In a computer system which is comprised of a system memory coupled by a system bus to a processor, and wherein the system memory stores instructions for providing a runtime environment for executing an interpreted language program, a method of improving the performance of the execution of the interpreted language program by the runtime environment, comprising:

prior to entry of the runtime environment, a step for compiling source code for the interpreted language into byte code;

prior to entry of the runtime environment, a step for passing at least some portions of the byte code for the interpreted language to a compiler which compiles the byte code into executable instructions;

a step for executing a program within the runtime environment, and invoking a method that is external to the program running in the runtime environment; and a step for determining whether the invoked external method is
   i) in byte code, and if so passing the byte code to either an interpreter or a compiler within the runtime environment, and thereafter passing the interpreted or compiled byte code in executable form to a runtime system of the runtime environment, or
   ii) if the invoked external method is in a compiled executable set of instructions, passing the executable set of instructions directly to the runtime system of the runtime environment for execution.

2. The method of claim 1 wherein the step for passing at least some portions of the byte code for the interpreted language to a compiler which compiles the byte code into executable instructions is comprised of the following acts:

creating a unique label for the byte code;

decoding the byte code; and converting the byte code into an equivalent compiled language instruction.

3. The method of claim 2 further comprising the act of pruning an unused label for a byte code.

4. The method of claim 2, wherein the act of creating unique label is comprised of the further act of creating a unique sequence number for the byte code.

5. The method of claim 4, wherein the unique sequence number for the byte code comprises an offset value for the byte code relative to a starting value for a program containing the byte code.

6. The method of claim 2, wherein the act of creating a unique label is comprised of the further act of relating the label to the byte code using a data structure.

7. The method of claim 2, wherein the act of converting the byte code into an equivalent compiled language instruction is comprised of the further act of inserting the label for a target byte code into a branching instruction when the byte code decodes into a branching instruction.

8. The method of claim 7, wherein the act inserting the label for a target byte code into a branching instruction when the byte code decodes into a branching instruction is comprised of the further act of generating the label for the target byte code by subtracting an offset value specified in the branching instruction from an offset value for the branching instruction.

9. In a computer system which is comprised of a system memory coupled by a system bus to a processor, and wherein the system memory stores instructions for providing a runtime environment for executing an interpreted language program, a software architecture for improving the performance of the execution of the interpreted language program by the runtime environment, comprising:

a first compile time environment comprising a compiler for compiling source code for the interpreted language into byte code and for storing the byte code in class files;

a second compile time environment comprising i) an inline code generator for processing at least some portions of the byte code for the interpreted language and producing compiled language code, and ii) a hardware specific language compiler for further processing the compiled language code to produce an executable (DLL) file; and a runtime environment comprising
i) a runtime system that comprises a stack, a constant pool and methods that are executed within the runtime system;
ii) a runtime interpreter; and
iii) a runtime compiler; and wherein, when executing a program within the runtime environment, and invoking a method that is external to the program running in the runtime environment, if the invoked external method is
i) In byte code, then passing the byte code to either the run time interpreter or a compiler within the runtime environment, and thereafter passing the interpreted or compiled byte code in executable form to the runtime system, or
ii) if the invoked external method is in a compiled executable set of instructions, passing the executable set of instructions directly to the runtime system of the runtime environment for execution.

10. In a computer system which is comprised of a system memory coupled by a system bus to a processor, and wherein the system memory stores instructions for providing a runtime environment for executing an interpreted language program, a computer program product for implementing within the computer system a method of improving the performance of the execution of the interpreted language program by the runtime environment, comprising:

a computer-readable medium carrying computer-executable instructions for causing said computer system to execute said method; and wherein said method is comprised of:
prior to entry of the runtime environment, a step for compiling source code for the interpreted language into byte code;
prior to entry of the runtime environment, a step for passing at least some portions of the byte code for the interpreted language to a compiler which compiles the byte code into executable instructions;
a step for executing a program within the runtime environment, and invoking a method that is external to the program running in the runtime environment; and
a step for determining whether the invoked external method is
a. in byte code, and if so passing the byte code to either an interpreter or a compiler within the runtime environment, and thereafter passing the interpreted or compiled byte code in executable form to a runtime system of the runtime environment, or
b. if the invoked external method is in a compiled executable set of instructions, passing the executables set of instructions directly to the runtime system of the runtime environment for execution.

11. The computer program product of claim 10, wherein the step for passing at least some portions of the byte code for the interpreted language to a compiler which compiles the byte code into executable instructions is comprised of the following acts:

creating a unique label for the byte code;

decoding the byte code; and converting the byte code into an equivalent compiled language instruction.

12. The computer program product of claim 11 wherein said method is further comprised of the acts of pruning an unused label for a byte code.

13. The computer program product of claim 11, wherein the act of creating a unique label is comprised of the further act of creating a unique sequence number for the byte code.

14. The computer program product of claim 13, wherein the unique sequence number for the code comprises an offset value for the byte code relative to a starting value for a program containing the byte code.

15. The computer program product of claim 11, wherein the act of creating a unique label is comprised of the further act of relating the label to the byte code using a data structure.

16. The computer program product of claim 11, wherein the act of converting the byte code into an equivalent compiled language instruction is comprised of the further act of inserting the label for a target byte code into a branching instruction when the byte code decodes into a branching instruction.

17. The computer program product of claim 16, wherein the act of inserting the label for a target byte code into a branching instruction when the byte code decodes into a branching instruction is comprised of the further act of generating the label for the target byte code by subtracting an offset value specified in the branching instruction from an offset value for the branching instruction.

* * * * *

UNITED STATES PATENT AND TRADEMARK OFFICE
CERTIFICATE OF CORRECTION

PATENT NO.    : 6,327,702 B1
DATED         : December 4, 2001
INVENTOR(S)   : David M. Sauntry and Mark Gilbert It is certified that error appears in the above-identified patent and that said Letters Patent is hereby corrected as shown below:

<u>Column 12,</u>
Line 46, after "for the" and before "code" insert -- byte --

Signed and Sealed this

Seventh Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,327,702 B1
DATED : December 4, 2001
INVENTOR(S) : David M. Sauntry and Mark Gilbert It is certified that error appears in the above-identified patent and that said Letters Patent is hereby corrected as shown below:

Title page,
Item [56], OTHER PUBLICATIONS, insert:
-- International Search Report for International Application No. PCT/US 99/30706",
Date of Completion July 13, 2000 Authorized Office: Kingma, Y., 7 Pages, (07/23/00)
Cramer, T., et al., "Compiling Java Just in Time", IEEE Micro, 17(3), XP000656035,
pp. 36-43, (May 1997)
Krall, A., "CACAO - A 64-bit Java VM just-in-time compiler", Concurrency:
Practice and Experience, John Wiley & Sons, Vol. 9, No. 11, XP002117590, 1017-1030-1030, (Nov. 1997)
Mills, C., et al., "Complied Instruction Set Simulation", Software practice & experience, John Wiley and Sons, Ltd, Vol. 21, No. 8, XP000297332, 877-889, (Augst 1, 1991)
Muller, G., et al., "Harissa: a flexible and efficient java environment mixing bytecode and complied code", Proc. Of 3rd USENIX conf. on object-orient technologies and systems, Berkeley CA XP000924917, 1-20 (June 16, 1997) --

Signed and Sealed this

Twenty-third Day of September, 2003

JAMES E. ROGAN
*Director of the United States Patent and Trademark Office*